United States Patent
Stühler et al.

(10) Patent No.: US 6,612,385 B1
(45) Date of Patent: Sep. 2, 2003

(54) METHOD FOR STARTING A FUEL CELL SYSTEM AND FUEL CELL SYSTEM

(75) Inventors: Walter Stühler, Hirschaid (DE); Alfred Weiss, Forchheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/690,299

(22) Filed: Oct. 17, 2000

Related U.S. Application Data

(63) Continuation of application No. PCT/DE99/01166, filed on Apr. 19, 1999.

(30) Foreign Application Priority Data

Apr. 17, 1998 (DE) .......................................... 198 17 188

(51) Int. Cl.⁷ .................................................. B60K 1/00
(52) U.S. Cl. ........................ 180/65.3; 180/65.2; 429/23
(58) Field of Search ............................... 180/65.1, 65.2, 180/65.3; 429/12, 13, 19, 23

(56) References Cited

U.S. PATENT DOCUMENTS

| | | | |
|---|---|---|---|
| 5,485,064 A | * | 1/1996 | Arnaud et al. .............. 318/139 |
| 5,631,532 A | * | 5/1997 | Azuma et al. ................. 320/5 |
| 5,645,950 A | * | 7/1997 | Benz et al. ................... 429/13 |
| 5,646,852 A | * | 7/1997 | Lorenz et al. ......... 364/431.051 |
| 5,760,488 A | * | 6/1998 | Sonntag ..................... 307/10.1 |
| 5,780,980 A | | 7/1998 | Naito |
| 5,794,732 A | * | 8/1998 | Lorenz et al. ............. 180/65.3 |
| 6,007,930 A | * | 12/1999 | Adams et al. ................ 429/13 |
| 6,158,537 A | * | 12/2000 | Nonobe ..................... 180/65.3 |
| 6,186,254 B1 | * | 2/2001 | Mufford et al. ............ 180/65.3 |

FOREIGN PATENT DOCUMENTS

| | | |
|---|---|---|
| DE | 43 22 767 A1 | 1/1995 |
| DE | 43 22 767 C2 | 5/1995 |
| DE | 197 31 250 A1 | 1/1998 |
| DE | 197 37 406 A1 | 3/1998 |
| JP | 8-289410 | 8/1996 |

* cited by examiner

*Primary Examiner*—Kenneth R. Rice
*Assistant Examiner*—James S. McClellan
(74) *Attorney, Agent, or Firm*—Laurence A. Greenberg; Werner H. Stemer; Ralph E. Locher

(57) ABSTRACT

A method for starting a mobile fuel cell system, in particular for a vehicle, includes conveying air to be supplied to the system during starting and operation of the system by a motor-powered compressor, in order to ensure a necessary operating pressure and, if required, additional humidifying of the air. A motor drive for the compressor has an electric motor which is supplied from a mobile starter battery during a starting phase. An output voltage of the starter battery is different from an operating voltage at an output of a fuel cell stack of the fuel cell system. A control device is provided between an output of the starter battery or of the fuel cell stack and a motor input. The control device interrupts the starting voltage supplied from the output of the starter battery and switches over to the output voltage of the fuel cell stack when the output operating voltage of the fuel cell stack reaches an adequate level. A fuel cell system is also provided.

27 Claims, 2 Drawing Sheets

METHOD FOR STARTING A FUEL CELL SYSTEM AND FUEL CELL SYSTEM

CROSS-REFERENCE TO RELATED APPLICATION

This application is a continuation of copending International Application No. PCT/DE99/01166, filed Apr. 19, 1999, which designated the United States.

BACKGROUND OF THE INVENTION

Field of the Invention

The invention relates to a method for starting a fuel cell system having a fuel cell stack, a compressor for supplying a working medium to the fuel cell stack, and an electric motor for driving the compressor. The invention also relates to a fuel cell system having a fuel cell stack, a compressor for supplying a working medium to the fuel cell stack, and an electric motor for driving the compressor.

German Patent DE 43 22 767 C2, corresponding to U.S. Pat. No. 5,794,732, discloses a fuel cell system and a method for starting a fuel cell system of the type mentioned initially. The fuel cell system described in that document is an air and hydrogen system. A compressor which can be powered by an electric motor is provided to compress the air in the known system. The electric motor is supplied from a mobile starter battery during a starting phase.

Since, in the prior art, the output voltage of the starter battery is different from the operating voltage of the fuel cell stack of the fuel cell system, which is present at the output of the fuel cell stack, a separate electric motor, which is constructed for the higher voltage of the fuel cell stack, is provided as well as the starter motor in the prior art. Such an apparatus is relatively complex since it requires two separate electric motors, which must be coupled to the compressor, occupying space and volume.

SUMMARY OF THE INVENTION

It is accordingly an object of the invention to provide a method for starting a fuel cell system and a fuel cell system, which overcome the herein afore-mentioned disadvantages of the heretofore-known methods and devices of this general type, which simplify operation of a compressor, which require less structural complexity and which occupy less space for the fuel cell system.

With the foregoing and other objects in view there is provided, in accordance with the invention, a method for starting a fuel cell system, which comprises providing a fuel cell stack; supplying a working medium to the fuel cell stack with a compressor; driving the compressor with an electric motor; initially feeding the electric motor with current from a starter battery; and then feeding the electric motor with current from the fuel cell stack.

The essence of the invention is to switch the power supply for the electric motor from the starter battery to the fuel cell stack and, if necessary, back again. The switching process takes place when the voltage at the output of the fuel cell stack reaches an adequate level. The electrical connection between the output of the starter battery and the motor input is interrupted, and the motor input is switched to the output voltage of the fuel cell stack.

In accordance with another mode of the invention, the fuel cell system is a mobile air and hydrogen system, in particular for a vehicle, such as a construction industry vehicle, a vehicle for use indoors, a bus or the like. The fuel cell system is supplied with air as the working medium during starting and operation, and the air is conveyed by the motor-driven compressor in order to ensure the necessary operating pressure and, if necessary, additional humidifying of the air. One suitable fuel cell system is a PEM fuel cell system with PEM fuel cells. In this case, PEM stands for Proton Exchange Membrane or Polymer Electrolyte Membrane.

In accordance with a further mode of the invention, during the starting phase of the fuel cell system, the electric motor of the compressor is advantageously supplied from the starter battery. During the starting phase, the fuel cell block does not yet develop any voltage, or does not yet develop the necessary voltage, in order to operate the electric motor.

In accordance with an added mode of the invention, a control device is provided for switching the power supply of the electric motor. The control device interrupts the electrical connection between the output of the starter battery and the motor input and switches over the motor input to the output voltage of the fuel cell stack when the output voltage of the fuel cell stack reaches an adequate level.

In accordance with an additional mode of the invention, the operating voltage of the electric motor advantageously corresponds to the voltage of the starter battery, and the control device advantageously includes a converter which regulates the output voltage of the fuel cell stack down to the operating voltage of the electric motor, or less. A current regulator is able to regulate the output voltage of the fuel cell stack down to the operating voltage of the direct-current motor and, in the process, also advantageously maintain this direct-current motor at a constant rotational speed.

The control device advantageously has two functions: firstly the selection and switching of the supplied operating voltage for the electric motor during the starting phase and during the operating phase of the system, and secondly the advantageous permanent regulation of the motor, which is important for optimized operation of the fuel cell stack, since the compressor is used to provide reproducible and advantageously optimized power levels.

In accordance with yet another mode of the invention, the switching from the starter battery to the output of the fuel cell stack advantageously takes place when the output voltage of the fuel cell stack is higher than the voltage of the starter battery. That is because, in this case, the converter just has to regulate the output voltage level of the fuel cell stack downward.

In accordance with yet a further mode of the invention, the output voltage of the fuel cell stack is advantageously approximately twice as great as the voltage of the starter battery. This refinement of the invention allows the electrical and electronic components of the converter to still have small dimensions for a mobile system.

In accordance with yet an added mode of the invention, the converter is a direct-current controller (DC/DC controller) and the electric motor is a direct-current motor.

In accordance with an alternative mode of the invention, the electric motor is a synchronous motor or an asynchronous motor and the control device includes a converter which is in the form of an inverter, for example a DC/three-phase AC inverter. Furthermore, the electric motor has two separate winding systems, with the first winding system being constructed for the voltage of the starter battery, and the second winding system being constructed for the higher voltage of the fuel cell stack.

In accordance with yet an additional mode of the invention, the control device also provides the motor regulation and the switching and selection of the two voltage sources. The first winding, which is constructed for the voltage of the starter battery, can be isolated from the voltage sources through disconnection elements. The disconnection elements can be controlled by the switching apparatus, in the form of a DC/three-phase AC controller. The second winding system, which is constructed for the operating voltage of the fuel cell stack, is continuously connected to the controller output.

Current is expediently drawn from the starter battery only until the voltage level at the output of the fuel cell stack has reached a changeover value, which can be preset. This is greater than the voltage level of the starter battery.

In accordance with again another mode of the invention, in order to protect the electrical components and the motor, the first winding system of the electric motor is expediently disconnected at the zero crossing.

With the objects of the invention in view, there is also provided a fuel cell system, comprising a starter battery; a fuel cell stack; a compressor for supplying a working medium to the fuel cell stack; and an electric motor for driving the compressor, the electric motor to be selectively operated with current from the starter battery and with current from the fuel cell stack.

In accordance with another feature of the invention, the fuel cell system is a mobile fuel cell system which can be operated with air and hydrogen, for powering vehicles. The fuel cell system includes at least one fuel cell stack, which in turn includes a number of fuel cells. The fuel cells are supplied, for example, with hydrogen and compressed air through a respective inlet. An air compressor is connected to the inlet of the fuel cells and has a motor drive with an electric motor which can be supplied from a starter battery.

In accordance with a further feature of the invention, the motor is connected to the power sources through an electronic control device. The control device has a converter having an intermediate circuit, that is, for example, a direct-current controller or an inverter, depending on whether the electric motor of the compressor is a direct-current motor, an alternating-current motor, or a three-phase motor.

In accordance with an added feature of the invention, apart from its control function, the control device advantageously also has a switching function and thus has a switching apparatus, which is connected electrically upstream of the input of the converter.

In accordance with an additional feature of the invention, the output of the converter is expediently permanently connected to the input of the electric motor.

In accordance with again another feature of the invention, if the control device is in the form of an inverter, for example a DC/three-phase AC controller, both the output of the starter battery and the output of the fuel cell stack can be permanently connected through decoupling diodes to the input of the DC/three-phase AC controller.

In accordance with again a further feature of the invention, the electric motor (which is in the form of a three-phase motor) of the compressor has two separate winding systems. In this case, the first winding system is constructed to be supplied with the low voltage of the starter battery, and the second winding system is constructed to be supplied with a higher voltage, namely the voltage of the fuel cell stack.

In accordance with again an added feature of the invention, the first electric motor winding system, which is constructed for the lower voltage, can be expediently disconnected as soon as a changeover voltage level, which could be dangerous to the sensitive first winding system, is reached.

In accordance with a concomitant feature of the invention, the actual disconnection apparatus is advantageously integrated in the electric motor, or the compressor motor.

Other features which are considered as characteristic for the invention are set forth in the appended claims.

Although the invention is illustrated and described herein as embodied in a method for starting a fuel cell system and a fuel cell system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF PREFERRED EMBODIMENTS

Figure 1:
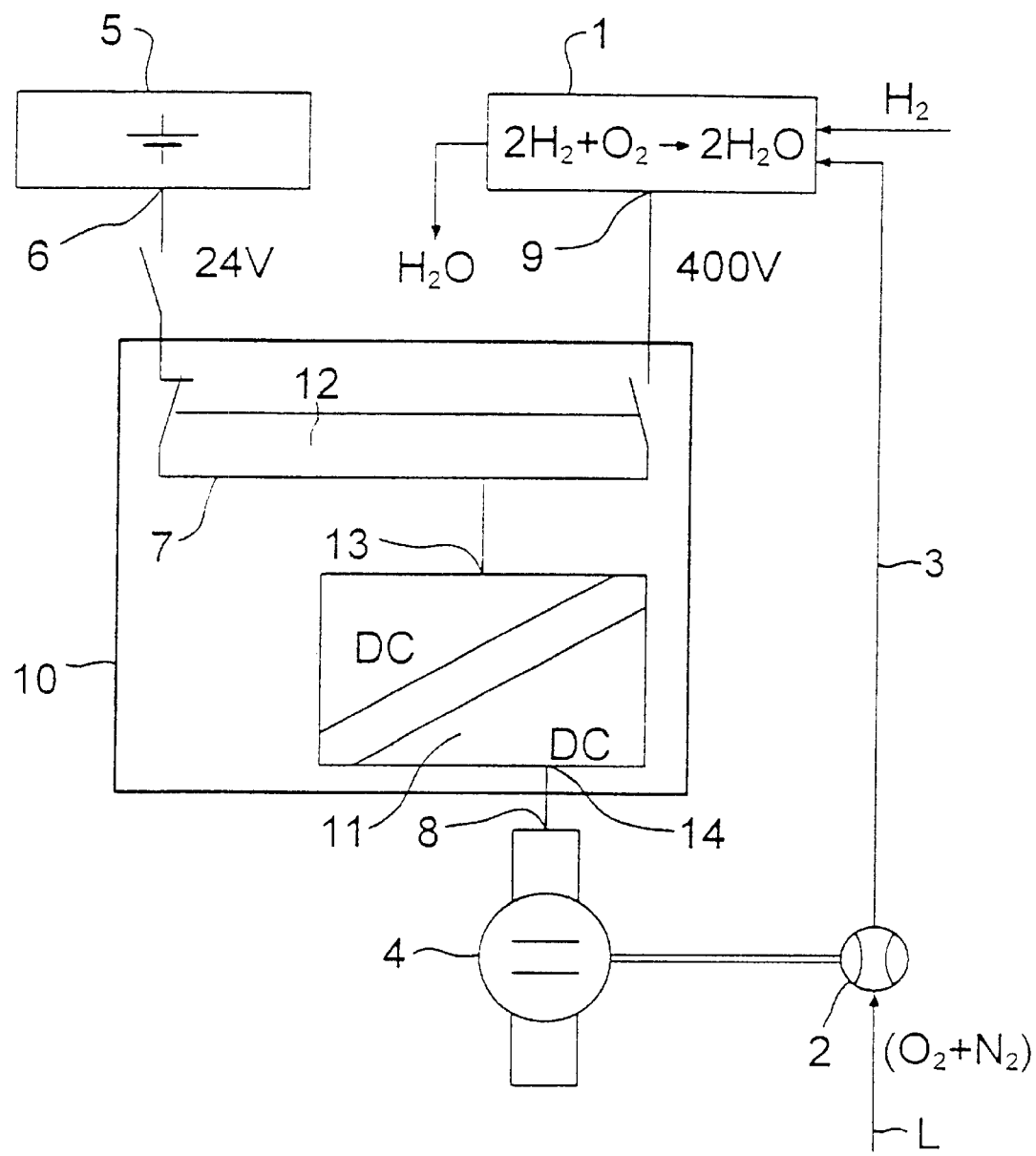
FIG. 1 is a schematic and block circuit diagram of a fuel cell system having a direct-current compressor motor.

Referring now to the figures of the drawings in detail and first, particularly, to FIG. 1 thereof, there is seen a mobile fuel cell system which is illustrated schematically with fundamental components relating to the invention and which includes a number of fuel cells that are configured and illustrated as a fuel cell stack 1. Compressed air is supplied to the fuel cell stack 1 through a compressor 2 and a line 3.

The compressor 2 is driven by an electric motor 4 which is supplied from a starter battery 5 during a starting or run-up phase of the fuel cell system. An output 6 of the starter battery 5 provides an operating voltage of 24 V, which is supplied to a motor input 8 through a cable 7. The motor input 8 is not only connected to the output 6 of the starter battery 5, but can also be connected to an output 9 of the fuel cell stack 1. For this purpose, a control device 10 is provided, which has a converter 11. The converter 11 is a direct-current controller (DC/DC controller) for the electric motor 4 (which is in the form of a direct-current motor) of the compressor 2.

Switching from the output 6 of the starter battery 5 to the output 9 of the fuel cell stack 1 takes place through a switching apparatus 12, having a switching response which can be controlled by an output 13 of the control device 10. An output 14 of the converter 11 is permanently connected to the input 8 of the electric motor 4.

Figure 2:
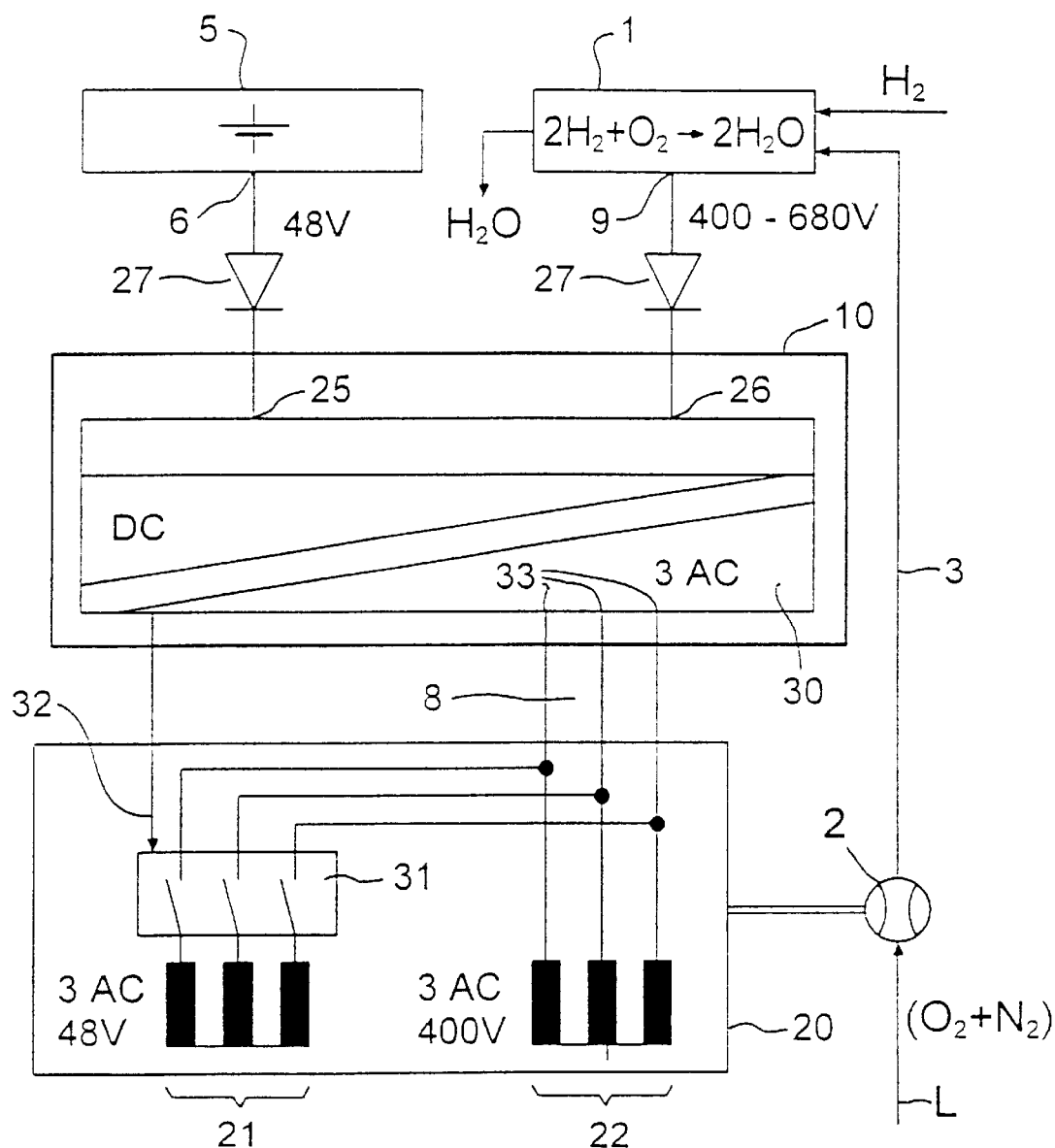
FIG. 2 is a schematic and block circuit diagram of a fuel cell system having a three-phase synchronous motor or a three-phase asynchronous motor.

FIG. 2 likewise illustrates a fuel cell system. However, an electric motor 20 for powering the compressor 2 is not a direct-current motor, but instead a three-phase synchronous motor or a three-phase asynchronous motor and has two separate first and second winding systems 21, 22. The first winding system 21 is constructed to be supplied with an output voltage from the starter battery 5, and the second winding system 22 is constructed to be supplied with a higher voltage from the fuel cell stack 1.

Output voltages at the outputs 6 and 9 of the voltage sources differ considerably in the exemplary embodiment illustrated in FIG. 2. The starter battery 5 supplies an output voltage of, for example, 48 V. The fuel cell stack 1 is constructed to produce an operating voltage of 400–680 V at its output 9.

Decoupling diodes 27 are connected in power cables between the output 6 of the starter battery 5 and an input 25 of the control device 10 as well as between the output 9 of the fuel cell stack 1 and an input 26 of the control device 10. The control device 10 has a converter 30 for the electric motor 20, which is in the form of an inverter (DC/three-phase AC controller).

Disconnection elements 31 are also integrated in the area of the electric motor 20 and can be activated through an output 32 of the control device 10 to isolate the winding system 21 from an output 33 of the converter 30. This is done when the fuel cell stack 1 reaches a voltage which is considerably higher than that of the starter battery. The fuel cell stack then supplies a direct-current section of the control device 10.

We claim:

1. A method for starting a fuel cell system, which comprises:

providing a fuel cell stack;

supplying a working medium to the fuel cell stack with a compressor;

driving the compressor with an electric motor having a first winding system constructed for a voltage of a starter battery and a separate second winding system constructed for an operating voltage of the fuel cell stack;

initially feeding the electric motor with current from the starter battery, then feeding the electric motor with current from the fuel cell stack with the first winding system electrically disconnected from the fuel cell stack; and providing a control device having a converter for controlling the feeding of the current to the electric motor.

2. The method according to claim 1, which further comprises providing a mobile air and hydrogen system as the fuel cell system, supplying the fuel cell system with air as the working medium during starting and operation, and conveying the air by the motor-driven compressor to ensure a necessary operating pressure and additional humidifying of the air.

3. The method according to claim 1, which further comprises supplying the electric motor driving the compressor from the starter battery during a starting phase of the fuel cell system.

4. The method according to claim 1, which further comprises setting a voltage of the starter battery to be different from an operating voltage of the fuel cell stack.

5. The method according to claim 1, which further comprises providing a control device between an input of the electric motor and at least one of an output of the starter battery and an output of the fuel cell stack, and interrupting a starting voltage supplied from the output of the starter battery and connecting an output voltage of the fuel cell stack to the electric motor, with the control device, when the fuel cell stack reaches an adequate output voltage.

6. The method according to claim 5, which further comprises providing the control device with a converter, setting an operating voltage of the electric motor to correspond to a voltage of the starter battery, and regulating the output voltage of the fuel cell stack with the converter down to at least a value of the operating voltage of the electric motor.

7. The method according to claim 6, which further comprises permanently regulating a rotational speed of the electric motor with the converter.

8. The method according to claim 6, which further comprises providing a direct-current controller as the converter, and providing a direct-current motor as the electric motor.

9. The method according to claim 5, which further comprises providing a converter having an intermediate circuit with components as the control device, and continuously increasing the operating voltage at the output of the fuel cell stack, for raising the components in the intermediate circuit of the converter to a higher operating voltage.

10. The method according to claim 1, which further comprises switching over the fuel cell system from the starter battery to the fuel cell stack as soon as an output voltage of the fuel cell stack is higher than a voltage of the starter battery.

11. The method according to claim 1, which further comprises setting an operating voltage of the fuel cell stack to be approximately twice as great as a voltage of the starter battery.

12. The method according to claim 1, which further comprises selecting an inverter as the converter.

13. The method according to claim 1, which further comprises permanently connecting the electric motor to an output of the converter, permanently connecting the second winding system, constructed for the operating voltage of the fuel cell stack, to the output of the converter, and isolating the first winding system, constructed for the voltage of the starter battery, from the fuel cell stack and the starter battery as voltage sources, through disconnection elements.

14. The method according to claim 13, which further comprises disconnecting the first winding system of the electric motor at a zero crossing.

15. The method according to claim 1, which further comprises drawing current from the starter battery only until an output voltage of the fuel cell stack has reached a value greater than a voltage of the starter battery.

16. The method according to claim 1, which further comprises providing the electric motor as a synchronous motor.

17. The method according to claim 1, which further comprises providing the electric motor as an asynchronous motor.

18. A fuel cell system, comprising:

a starter battery;

a fuel cell stack;

a compressor for supplying a working medium to said fuel cell stack; and an electric motor for driving said compressor, said electric motor to be selectively operated with only current from said starter battery and with only current from said fuel cell stack.

19. The fuel cell system according to claim 18, wherein said starter battery and said fuel cell stack have outputs, said electric motor has an input, and an electronic control device with a converter is to be connected between said input of said electric motor and said outputs of said starter battery and said fuel cell stack.

20. The fuel cell system according to claim 19, wherein said converter has an input, and a switching apparatus is connected electrically upstream of said input of said converter.

21. The fuel cell system according to claim 20, wherein said switching apparatus has inputs connected to said starter battery and to said fuel cell stack to be switched over smoothly.

22. The fuel cell system according to claim 19, wherein said converter has an output permanently connected to said input of said electric motor.

23. The fuel cell system according to claim 18, wherein said electric motor is a synchronous or asynchronous motor having a first winding system constructed to be supplied with a low voltage and a separate second winding system constructed to be supplied with a higher voltage.

24. The fuel cell system according to claim 23, wherein said starter battery and said fuel cell stack have outputs, a converter has an input, and decoupling diodes permanently connect said outputs of said starter battery and said fuel cell stack to said input of said converter.

25. The fuel cell system according to claim 23, wherein said first winding constructed for low voltage is to be disconnected.

26. The fuel cell system according to claim 25, including disconnection elements integrated in said electric motor.

27. A mobile fuel cell system to be operated with air and hydrogen for a vehicle propulsion system, comprising:

a starter battery;

a fuel cell stack having a number of fuel cells, an inlet for hydrogen and an inlet for compressed air;

a compressor connected to said air inlet for supplying a working medium to said fuel cell stack; and an electric motor for driving said compressor, said electric motor to be selectively operated with only current from said starter battery and with only current from said fuel cell stack.

* * * * *